United States Patent
Chen et al.

(10) Patent No.: US 12,450,369 B2
(45) Date of Patent: Oct. 21, 2025

(54) SYSTEM AND METHOD FOR REMOTELY VERIFYING PHYSICAL SECURITY KEYS

(71) Applicant: INSYDE SOFTWARE CORP., Taipei (TW)

(72) Inventors: I-Te Chen, Taipei (TW); Chuang-Yi Chiu, Taipei (TW)

(73) Assignee: INSYDE SOFTWARE CORP., Taipei (TW)

( * ) Notice: Subject to any disclaimer, the term of this patent is extended or adjusted under 35 U.S.C. 154(b) by 231 days.

(21) Appl. No.: 18/318,746

(22) Filed: May 17, 2023

(65) Prior Publication Data
US 2024/0256682 A1 Aug. 1, 2024

(30) Foreign Application Priority Data
Jan. 31, 2023 (CN) .......................... 202310084156.1

(51) Int. Cl.
*G06F 21/60* (2013.01)
*H04L 9/08* (2006.01)
*H04L 9/32* (2006.01)

(52) U.S. Cl.
CPC .......... *G06F 21/604* (2013.01); *H04L 9/3271* (2013.01); *H04L 9/0827* (2013.01); *H04L 9/321* (2013.01); *H04L 9/3247* (2013.01)

(58) Field of Classification Search
CPC ..... G06F 21/604; H04L 9/321; H04L 9/0827; H04L 9/3247; H04L 9/3271
USPC ....................................................... 726/26
See application file for complete search history.

(56) References Cited

U.S. PATENT DOCUMENTS

| | | | |
|---|---|---|---|
| 10,873,468 B2 | 12/2020 | Melo et al. | |
| 2017/0337369 A1* | 11/2017 | Cesnik | G06F 21/44 |
| 2019/0028269 A1* | 1/2019 | Lu | H04L 9/0822 |
| 2019/0386993 A1* | 12/2019 | Lu | H04L 63/0884 |
| 2020/0092284 A1* | 3/2020 | Zhu | H04L 9/3234 |
| 2020/0104841 A1 | 4/2020 | Osborn et al. | |
| 2020/0274866 A1 | 8/2020 | Vilmos | |
| 2020/0382328 A1* | 12/2020 | Bhattacharya | G06F 21/78 |
| 2021/0075606 A1* | 3/2021 | Zeh | H04L 9/0897 |

(Continued)

OTHER PUBLICATIONS

Michal Kepkowski et al: "How Not to Handle Keys: Timing Attacks on FIDO Authenticator Privacy", arxiv.org, Cornell University Library, 201 Olin Library Cornell University Ithaca, NY 14853, May 17, 2022 (May 17, 2022), XP091227357, * Sections 1 and 2 *.

*Primary Examiner* — Thanh T Le

(57) ABSTRACT

A system for remotely verifying physical security keys and a method thereof are provided. The system includes a physical key, a control device, and a controlled platform. The control device is electrically connected to the physical key. The controlled platform is linked to the control device via digital transmission. The control device sends a verification application message to an application service program linked to the controlled platform through the digital transmission; according to the verification application message, the controlled platform responds to the control device via the digital transmission with a challenge value signing procedure to request a signature; according to the challenge value signature procedure, the control device performs a signature procedure on the physical key to complete verification. In this way, the physical key is remotely authenticated by the control device to achieve the purpose of improving information security.

4 Claims, 6 Drawing Sheets

(56) References Cited

U.S. PATENT DOCUMENTS

| | | |
|---|---|---|
| 2021/0184867 A1 | 6/2021 | Melo et al. |
| 2021/0192037 A1* | 6/2021 | Ehrensvärd ......... H04L 63/0876 |
| 2021/0392004 A1* | 12/2021 | Kim ...................... H04L 9/3268 |
| 2022/0014374 A1* | 1/2022 | Lin ......................... H04W 4/70 |
| 2022/0103568 A1* | 3/2022 | Suenaga ............... H04L 63/105 |
| 2022/0116232 A1* | 4/2022 | Oliver .................. G06F 21/577 |
| 2022/0321354 A1 | 10/2022 | Ladd et al. |
| 2022/0368520 A1* | 11/2022 | Toshimitsu ......... G07C 9/00563 |
| 2022/0377063 A1* | 11/2022 | Gomi .................... H04L 63/126 |

* cited by examiner

SYSTEM AND METHOD FOR REMOTELY VERIFYING PHYSICAL SECURITY KEYS

CROSS-REFERENCE TO RELATED APPLICATION

This application claims the priority benefit of Chinese Patent Application Serial Number 202310084156.1, filed on Jan. 31, 2023, the full disclosure of which is incorporated herein by reference.

BACKGROUND

Technical Field

The present disclosure relates to the technical field of information security system, particularly to a system and method for remotely verifying physical security keys.

Related Art

In the current era where information transmission is common, if a malicious person intervenes in the middle of the transmission, stealing personal or corporate information, it would cause a great loss to the individual or business. Therefore, information security has gradually received more attention.

Physical keys are common for the information security method in the prior art. The physical key is connected to an information system, so as to operate the information system according to the physical key. Common specifications are a Universal Second Factor (U2F) of an Identity Recognition Mechanism (Fast Identity Online, FIDO), Universal Authentication Framework (UAF), FIDO 2 identity authentication (W3C's Web Authentication, WebAuthn), or Client to Authenticator Protocol (CTAP). Even if the user account and password are cracked or leaked by force, the information system can be prevented from being invaded.

The authentication of the physical key in the prior art is divided into two processes, including a registration process and an authentication process. Both processes require the physical key to be electrically connected to an electronic device. The connection includes Universal Serial Bus, USB, Near Field Communication, NFC or Bluetooth. After the registration process is executed, Challenge and a public key are generated, and the authentication information of the public key is stored in a registration and authentication database (Relying Party, RP). When there is an authentication requirement, the electronic device obtains a challenge and a public key index (Key Handle) and transmits the challenge and the public key index to the physical key through the same connection to generate a challenge value signature. In order to ensure the legitimacy of the signature, after the signature is completed, the challenge and the public key index would be transmitted to the RP for public key authentication and registration information matching.

However, the physical key in the prior art needs to be directly electrically connected to the electronic device before the physical key can be authenticated. If the physical key cannot be electrically connected directly with the electronic device, the authentication procedure cannot be started, which leads to the abandonment of this process, resulting in risks to information security.

Therefore, it is desirous to provide a better solution.

SUMMARY

In view of the deficiencies in the prior art above, the disclosure provides a system and method for remote verification of physical security keys. The information processing and network communication technologies are adopted to enable remote verification of physical security keys to achieve the purpose of improving information security.

In one aspect, the disclosure provides a system for remotely verifying physical security keys comprising: a physical key; a control device, which is electrically connected to the physical key; and a controlled platform linked to the control device via digital transmission; wherein the control device sends a verification application message to an application service program linked to the controlled platform through the digital transmission; according to the verification application message, the controlled platform responds to the control device via the digital transmission with a challenge value signing procedure to request a signature; according to the challenge value signature procedure, the control device performs a signature procedure on the physical key to complete verification.

In one embodiment, the controlled platform comprises: a controlled device linked to the control device via the digital transmission; and a registration and authentication database linked to the controlled device; wherein the controlled device requests a challenge value signature request signal to the registration and authentication database according to the verification application message; the registration and authentication database responds to the controlled device with a challenge value and a public key index response signal according to the challenge value signature request signal; the controlled device responds to the challenge value and the public key index response signal to the control device according to the verification application message; the control device initiates a challenge value signature on the physical key according to the challenge value and the public key index response signal.

In one embodiment, the system further comprises a registration and authentication database linked to a controlled device of the controlled platform; wherein the controlled device requests a challenge value signature request signal to the registration and authentication database according to the verification application message; the registration and authentication database responds to the controlled device with a challenge value and a public key index response signal according to the challenge value signature request signal; the controlled device responds to the control device with the challenge value and the public key index response signal according to the verification application message; the control device initiates a challenge value signature on the physical key according to the challenge value and the public key index response signal.

In one embodiment, the physical key performs the signature according to the challenge value and the public key index response signal.

In one embodiment, the physical key responds the signature to the control device according to the signature; the control device responds the signature to the controlled device according to the signature; the controlled device responds the signature to the registration and authentication database according to the signature; the application service program of the registration and authentication database completes the verification according to the signature.

Through the above configuration, through the digital transmission, the control device and the controlled platform can remotely carry out an authentication procedure on the physical key to confirm whether the physical key is a legitimate user, to achieve the purpose of improving information security.

In another aspect, the disclosure provides a method for remotely verifying physical security keys, adapted to a physical key for digital transmission between a control device and a controlled platform. The method comprises the control device sending a verification application message to an application service program linked to the controlled platform through digital transmission; according to the verification application message, the controlled platform responding to the control device via the digital transmission with a challenge value signing procedure to request a signature; and according to the challenge value signature procedure, the control device performing a signature procedure on the physical key to complete verification.

In one embodiment, the step that according to the verification application message the controlled platform responding to the control device via the digital transmission with a challenge value signing procedure to request a signature further comprises the controlled device requesting a challenge value signature request signal to the registration and authentication database according to the verification application message; the registration and authentication database responding to the controlled device with a challenge value and a public key index response signal according to the challenge value signature request signal; the controlled device responding to the challenge value and the public key index response signal to the control device according to the verification application message; and the control device initiating a challenge value signature on the physical key according to the challenge value and the public key index response signal.

In one embodiment, after the step that the control device initiating a challenge value signature on the physical key according to the challenge value and the public key index response signal, the method further comprises the physical key performing the signature according to the challenge value and the public key index response signal.

In one embodiment, the step that the control device initiating a challenge value signature on the physical key according to the challenge value and the public key index response signal further comprises determining whether the physical key establishes an electrical connection with the control device; and when the electrical connection establishes, the physical key transmits the challenge value signature to the controlled platform through the control device.

In one embodiment, the step that according to the challenge value signature procedure, the control device performing a signature procedure on the physical key to complete verification further comprises the physical key responding the signature to the control device according to the signature; the control device responding the signature to the controlled device according to the signature; the controlled device responding the signature to the registration and authentication database according to the signature; and the application service program of the registration and authentication database completing the verification according to the signature.

Through the above method, through the digital transmission, the control device and the controlled platform can remotely carry out an authentication procedure on the physical key to confirm whether the physical key is a legitimate user, to achieve the purpose of improving information security.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
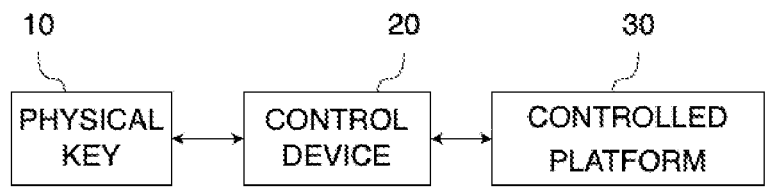
FIG. 1 is a system block diagram of the system for remotely verifying physical security keys of the present disclosure.

Regarding a preferred embodiment of the present disclosure, as shown in FIG. 1, showing a system 1 for remotely verifying the physical security keys. The system 1 includes a physical key 10, a control device 20 and a controlled platform 30. The control device 20 is linked with the controlled platform 30 by way of digital transmission. A verification signal of the physical key 10 is transmitted to the controlled platform 30 through the control device 20, so as to authenticate the physical key 10 (Authentication). In this embodiment, the digital transmission is compliant with a network transmission protocol or a Bluetooth communication protocol, etc. The network transmission protocol includes TCP/IP, a User Datagram Protocol (UDP), Message Queuing Telemetry Transport (MQTT), etc. Transport Layer Security (TLS) can be used to improve security. In this embodiment, the controlled platform 30 may be a cloud server.

Figure 2:
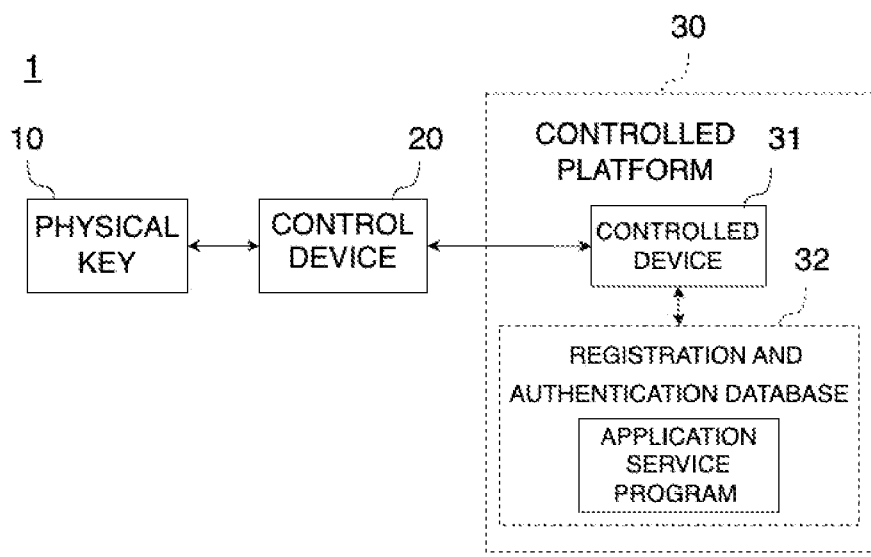
FIG. 2 is another system block diagram of the system for remotely verifying physical security keys of the present disclosure.

Specifically, the control device 20 sends a verification application message to the application service program linked to the controlled platform 30 (for example, Google identity verification and authentication) through the digital transmission. According to the verification application message, the controlled platform 30 responds to the control device 20 with a challenge value (Challenge) signature procedure through the digital transmission to request a signature. According to the challenge value signature procedure, the control device 20 performs a signature procedure on the physical key 10 to complete verification. In this embodiment, as shown in FIG. 2, the controlled platform 30 includes a controlled device 31 and a registration and authentication database (Relying Party, RP) 32. The controlled device 31 is linked with the control device 20 through the digital transmission. The registration and authentication database 32 is linked with the controlled device 31. The controlled device 31 requests a challenge value signature request signal to the registration and authentication database 32 according to the verification application message. The registration and authentication database 32 responds to the controlled device 31 with a challenge value and a public key index response signal (Key Handle) according to the challenge value signature request signal. According to the verification application message, the challenge value and the Key Handle response signal are responded to the control device 20. The control device 20 initiates a challenge value signature to the physical key 10 according to the challenge value and the Key Handle response signal. The physical key 10 performs the signature according to the challenge value and the Key Handle response signal. In this embodiment, the controlled device 31 includes Universal Second Factor (U2F) of an identity recognition mechanism (Fast Identity Online, FIDO), Universal Authentication Framework (UAF), the identity of FIDO 2 Authentication (W3C's Web Authentication, WebAuthn), Client to Authenticator Protocol) or CTAP2, etc.

In this embodiment, when the control device 20 receives the challenge value and the public key index response signal, the system determines whether the physical key 10 is electrically connected to the control device 20. When the electrical connection between the physical key 10 and the control device 20 is not been established, the user is required to establish an electrical connection between the physical key 10 and the control device 20. When the physical key 10 establishes an electrical connection with the control device 20, the physical key 10 transmits the verification signal to the controlled platform 30 through the control device 20.

In this embodiment, the physical key 10 responds the signature to the control device 20 according to the signature. The controlled device 31 responds the signature to the registration and authentication database 32 according to the signature. The registration and authentication database 32 compares whether the signature matches the challenge value and a public key index in the public key index response signal. If they match, the verification is complete.

Figure 3:
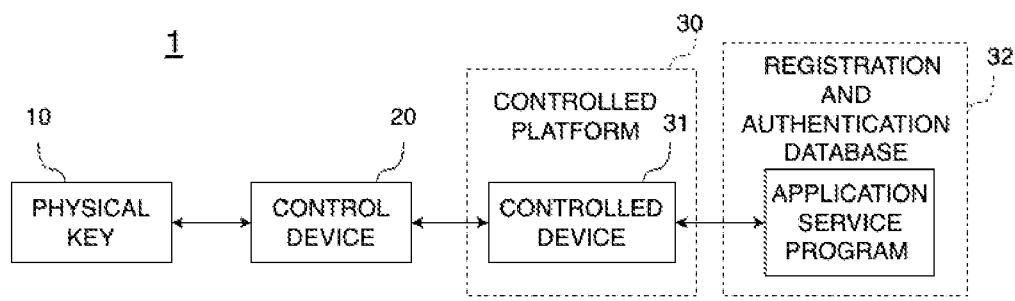
FIG. 3 is another system block diagram of the system for remotely verifying physical security keys of the present disclosure.

In addition, another embodiment of the present disclosure, as shown in FIG. 3, the controlled platform 30 comprises a controlled device 31. The controlled device 31 is linked with the external registration and authentication database 32 through digital transmission. In the above embodiment, the registration and authentication database 32 includes the application service program. The application service program is linked with the controlled platform 30. Specifically, through the link between the controlled device 31 and the registration and authentication database 32, the controlled device 31 can be linked with the application service program. The application service program responds to the controlled device 31 in response to the verification application message. In this embodiment, the registration and authentication database 32 stores the Key Handle and records the verification result of the physical key 10 and the Key Handle.

Figure 4:
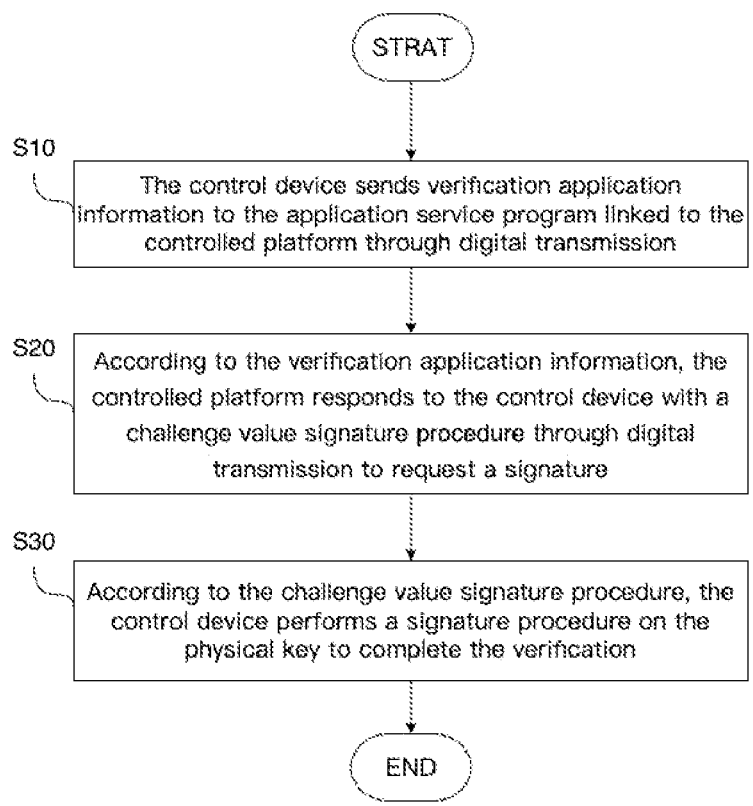
FIG. 4 is a flow chart of the method for remotely verifying physical security keys of the present disclosure.

According to the above-mentioned embodiments, the present disclosure further summarizes a method for remotely verifying physical security keys, as shown in FIG. 4, the method is mainly executed on the aforementioned system 1 for remotely verifying entity security keys. The physical key 10 is provided by the system 1 for remotely verifying physical security keys and is applied to the control device 20 and the controlled platform 30. The digital transmission is performed between the control device 20 and the controlled platform 30. The method includes: the control device 20 sending a verification application message to an application service program linked to the controlled platform 30 through the digital transmission (S10); according to the verification application message, the controlled platform 30 responding to the control device 20 with a challenge value signing procedure through the digital transmission to request a signature (S20); and according to the challenge value signature procedure, the control device 20 performing a signature procedure on the physical key 10 to complete verification (S30).

Figure 5:
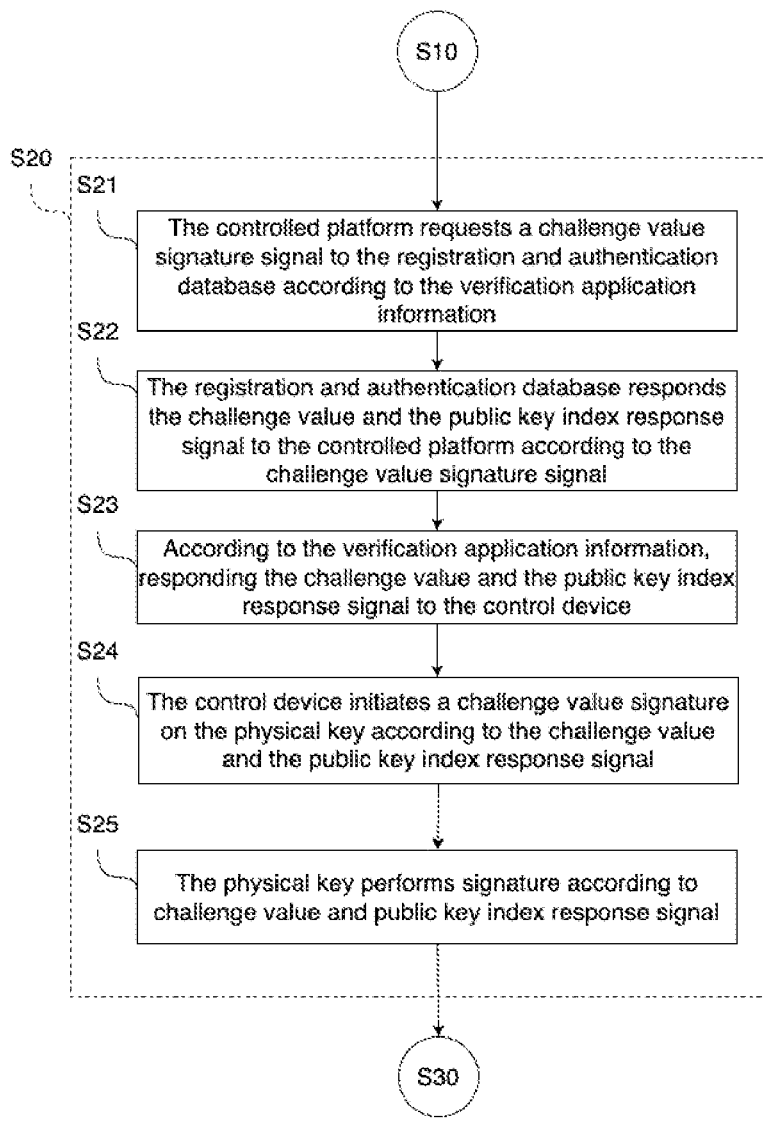
FIG. 5 is another flow chart of the method for remotely verifying physical security keys of the present disclosure.

In this embodiment, as shown in FIG. 5, when the aforementioned method executes the step that the controlled platform 30 responding to the control device 20 with a challenge value signing procedure through the digital transmission to request a signature (S20), the method further includes: the controlled platform 30 requesting a challenge value signature signal to a registration and authentication database 32 according to the verification application message (S21); the registration and authentication database 32 responding to the controlled platform 30 with a challenge value and a public key index response signal according to the challenge value signature signal (S22); responding to the control device 20 with the challenge value and the public key index response signal according to the verification application message (S23); and the control device 20 initiating a challenge value signature to the physical key 10 according to the challenge value and the public key index response signal (S24).

In this embodiment, as shown in FIG. 5, after the step that the control device 20 initiating a challenge value signature to the physical key 10 according to the challenge value and the public key index response signal (S24), the method further includes: the entity key 10 performing the signature according to the challenge value and the public key index response signal (S25).

Figure 6:
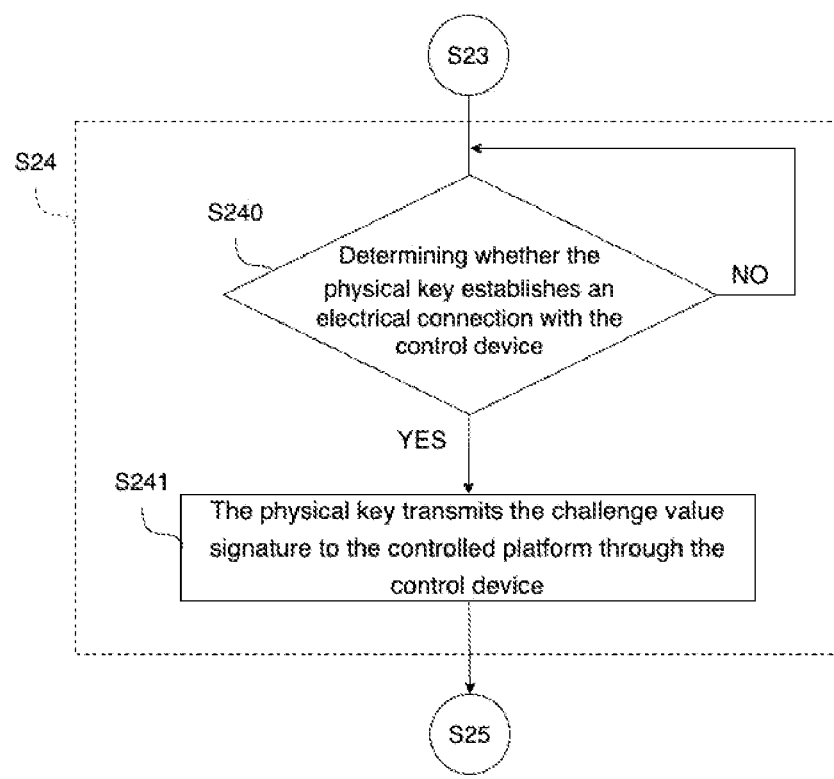
FIG. 6 is another flow chart of the method for remotely verifying physical security keys of the present disclosure.
Figure 7:
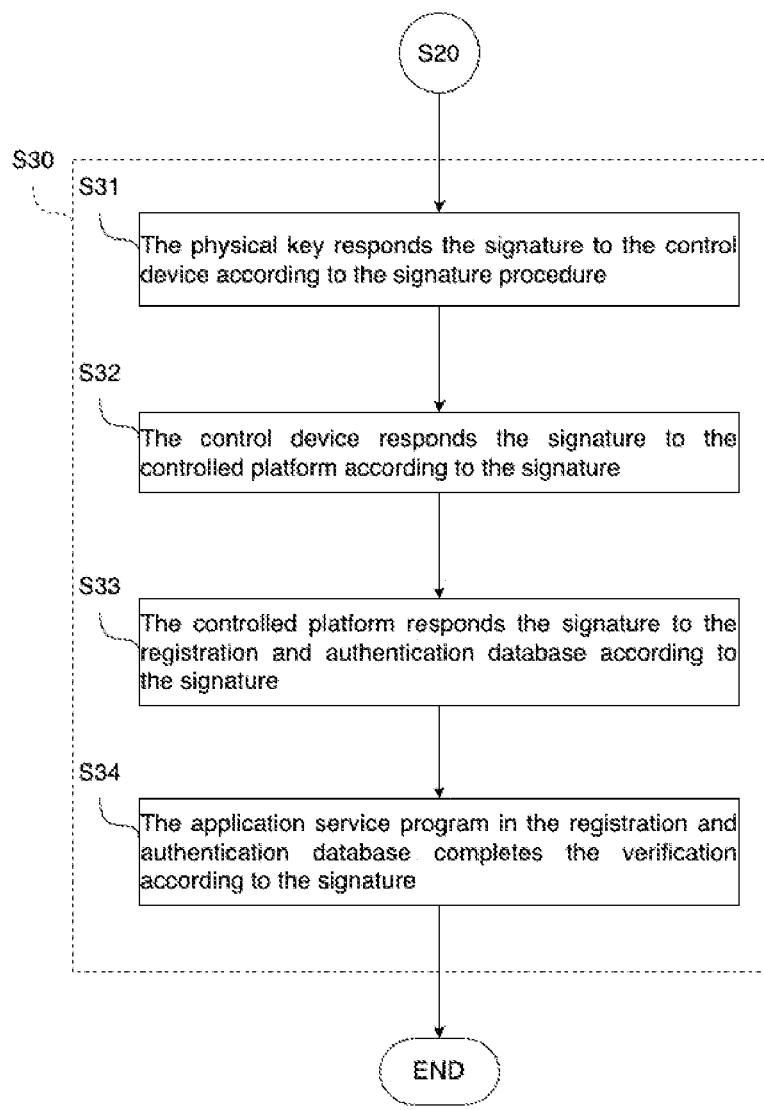
FIG. 7 is another flow chart of the method for remotely verifying physical security keys of the present disclosure.

In this embodiment, as shown in FIG. 6, after the step that the control device 20 initiating a challenge value signature to the physical key 10 according to the challenge value and the public key index response signal (S24), the method further includes: determining whether the physical key 10 establishes an electrical connection with the control device 20 (S240); when the electrical connection is established, the physical key 10 transmits the challenge value signature to the controlled platform 30 through the control device 20 (S241); when the electrical connection is not established, the method returns to the step that the control device 20 initiating a challenge value signature to the physical key 10 according to the challenge value and the public key index response signal (S24).

In this embodiment, as shown in FIG. 5, when the aforementioned method executes the step that according to the challenge value signature procedure, the control device 20 performing a signature procedure on the physical key 10 to complete verification (S30), the method further includes: the physical key 10 responding the signature to the control device 20 according to the signature procedure (S31); the control device 20 responding the signature to the controlled platform 30 according to the signature (S32); the controlled platform 30 responding the signature to the registration and authentication database 32 according to the signature (S33); and the application service program in the registration and authentication database 32 completing verification according to the signature (S34).

In summary, through the digital transmission, the control device 20 and the controlled platform 30 can remotely carry out an authentication procedure on the physical key 10 to confirm whether the physical key is a legitimate user, to achieve the purpose of improving information security.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A method for remotely verifying physical security keys, adapted to a physical key, a control device and a controlled platform linked to the control device, the method comprising:
   the control device sending a verification application message to an application service program linked to the controlled platform through digital transmission;
   according to the verification application message, the controlled platform responding to the control device via the digital transmission with a challenge value signing procedure to request a signature; and
   according to the challenge value signature procedure, the control device performing a signature procedure on the physical key to complete verification;
   wherein the step that according to the verification application message the controlled platform responding to the control device via the digital transmission with a challenge value signing procedure to request a signature further comprises:
   the controlled device requesting a challenge value signature request signal to the registration and authentication database according to the verification application message;
   the registration and authentication database responding to the controlled device with a challenge value and a public key index response signal according to the challenge value signature request signal;
   the controlled device responding to the challenge value and the public key index response signal to the control device according to the verification application message; and
   the control device initiating a challenge value signature on the physical key according to the challenge value and the public key index response signal.

2. The method according to claim 1, wherein after the step that the control device initiating a challenge value signature on the physical key according to the challenge value and the public key index response signal, the method further comprises the physical key performing the signature according to the challenge value and the public key index response signal.

3. The method according to claim 1, wherein the step that the control device initiating a challenge value signature on the physical key according to the challenge value and the public key index response signal further comprises:
   determining whether the physical key establishes an electrical connection with the control device; and
   when the electrical connection establishes, the physical key transmits the challenge value signature to the controlled platform through the control device.

4. The method according to claim 3, wherein the step that according to the challenge value signature procedure, the control device performing a signature procedure on the physical key to complete verification further comprises:
   the physical key responding the signature to the control device according to the signature;
   the control device responding the signature to the controlled device according to the signature;
   the controlled device responding the signature to the registration and authentication database according to the signature; and
   the application service program of the registration and authentication database completing the verification according to the signature.

* * * * *